M. SACKETT.
Hand Seeder.
No. 88,416.
Patented March 30, 1869.
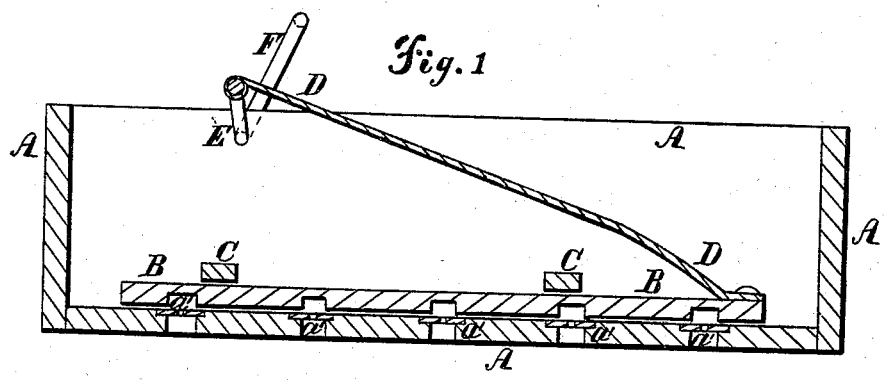
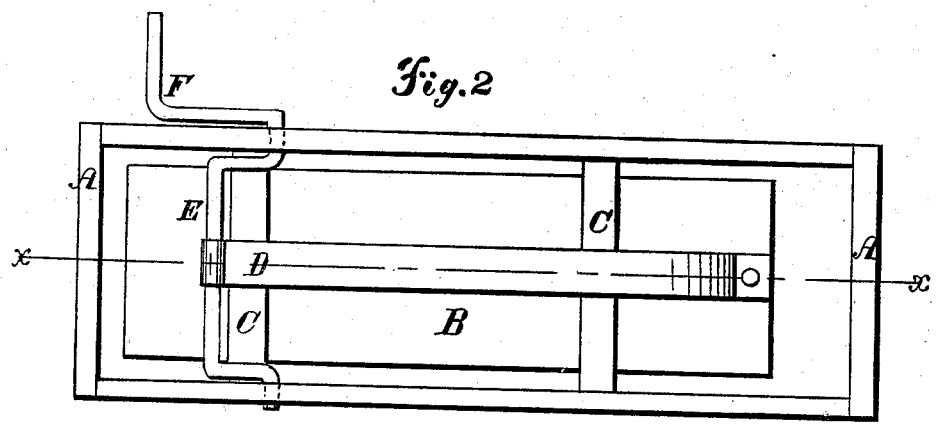

United States Patent Office.

MATTHEW SACKETT, OF MONTICELLO, IOWA, ASSIGNOR TO HIMSELF AND JOHN FILSON, OF SAME PLACE.

Letters Patent No. 88,416, dated March 30, 1869.

IMPROVEMENT IN BROADCAST-SEEDER.

The Schedule referred to in these Letters Patent and making part of the same.

*To all whom it may concern:*

Be it known that I, MATTHEW SACKETT, of Monticello, in the county of Jones, and State of Iowa, have invented a new and improved Broadcast-Seeder; and I do hereby declare that the following is a full, clear, and exact description thereof, which will enable others skilled in the art to make and use the same, reference being had to the accompanying drawings, forming part of this specification, in which—

Figure 1 is a vertical longitudinal central section of my improved seeder taken through the line $x\ x$, fig. 2.

Figure 2 is a top or plan view of the same.

Similar letters of reference indicate like parts.

My invention has for its object to furnish an improved broadcast-seeder, designed especially for sowing timothy, clover, and other small seeds, and which shall be simple in construction and convenient in use; and It consists in the construction and combination of the various parts, as hereinafter more fully described.

A represents a narrow and shallow box, which may be of any desired length.

B is a board, which is made shorter and narrower than the interior of the box A, so that it may have a longitudinal movement, and so that the seeds may pass down between its side edges and the side walls of the box A.

In the bottom of the box A is formed a row of holes, or perforations, at the inner ends of which are placed metallic eyelets, or plates $a'$, having small holes in their centre, of such a size as to allow the seeds to pass through, as shown in fig. 1.

The lower surface of the board B is grooved transversely, so that the seeds may pass into said grooves, and be pushed through the holes in the bottom of the box A by the longitudinal movement of the said board B. The board B is held down against the bottom of the box A, while moving back and forth, by the cross-bars C, the ends of which are secured to the sides of the box A, and beneath which the said board B moves or slides.

D is a spring, or elastic connection-bar, one end of which is secured to the board B near one end, and upon the other end of which is formed an eye, through which passes the crank of the shaft E.

The shaft E works in bearings in the sides of the box A, and upon one of its ends is formed, or to it is attached, a crank, F, by means of which the seeder is operated.

The seeder may be carried by the sower, while he walks along, and turns the crank F faster or slower, according as he wishes the seed sown thicker or thinner, or it may be run upon wheels, as may be most convenient.

Having thus described my invention,

I claim as new, and desire to secure by Letters Patent—

The combination of the sliding board B, grooved transversely with the perforated bottom of the box A and eyelets $a'$, when the board is connected to the crank E F by the spring D, arranged as described for the purpose specified.

MATTHEW SACKETT.

Witnesses:
GEORGE A. HANNA,
LANE A. HANNA.